United States Patent [19]

Shilo

[11] Patent Number: 5,287,263
[45] Date of Patent: Feb. 15, 1994

[54] INRUSH CURRENT CONTROL CIRCUIT

[75] Inventor: Marcel Shilo, Framingham, Mass.

[73] Assignee: Digital Equipment Corporation, Maynard, Mass.

[21] Appl. No.: 907,378

[22] Filed: Jul. 1, 1992

[51] Int. Cl.$^5$ .............................................. H02M 7/19
[52] U.S. Cl. ..................................... 363/143; 323/908
[58] Field of Search ................ 323/908, 299; 363/143

[56] References Cited

U.S. PATENT DOCUMENTS

| | | |
|---|---|---|
| 4,389,702 | 6/1983 | Clemente et al. |
| 4,608,500 | 8/1986 | Togawa |
| 4,665,323 | 5/1987 | Russell et al. |
| 4,730,122 | 3/1988 | Dreibelbis et al. |
| 4,780,805 | 10/1988 | Chewuk et al. ...................... 363/142 |
| 4,800,329 | 1/1989 | Masaki ................................ 323/242 |
| 5,097,402 | 3/1992 | Kriz et al. ............................. 363/61 |

FOREIGN PATENT DOCUMENTS

| | | |
|---|---|---|
| 3344105 | 6/1985 | Fed. Rep. of Germany ...... 363/143 |
| 55-162881 | 12/1980 | Japan ................................... 363/143 |

OTHER PUBLICATIONS

IBM Technical Disclosure Bulletin, vol. 31 No. 6 Nov. 1988 p. 20 (Fig. 1).
IBM Technical Disclosure Bulletin, vol. 27 No. 103 Mar. 1985 pp. 6214-6215.
IBM Technical Disclosure Bulletin, vol. 28 No. 12 May 1986 pp. 5495-5496.
Brian Long, "A New Integrated AVS Controller", Power Supply Spring/Summer 1990, pp. 38-39.
George Templeton, "RC Snubber Networks For Thyristor Power Control and Transient Suppression", Semiconductor Application Note No. AN1048, Motorola Inc., 1989, pp. 3-9.

Primary Examiner—Steven L. Stephan
Assistant Examiner—Davidson
Attorney, Agent, or Firm—Cesari and McKenna

[57] ABSTRACT

A power supply maintains a rectifier circuit in a non-doubler mode configuration when the power supply is attached to a 110-120 volt AC power source, until bulk capacitors in the rectifying circuit are charged to a combined potential of $(\sqrt{2})*110-120$ volts. The power supply then switches to a doubler mode configuration and the capacitors charge separately to a combined potential of $(\sqrt{2})*220-240$ volts. The two step charging procedure reduces the inrush current, over that developed in charging the capacitors from a zero volt potential to a combined potential of $(\sqrt{2})*240$ volts. It thus limits the current through a switch which configures the power supply in the doubler mode. If the power supply operates only with a 110-120 volt AC power source, which is common in high power industrial applications smaller diodes may be used in the rectifier circuitry since the inrush current is reduced. In such high power industrial applications, a reduction of the inrush currents means that fuses and circuit breakers in the power supply may be selected in accordance with the current levels associated with the steady state operation of the supply, rather than the inrush current levels.

3 Claims, 2 Drawing Sheets

INRUSH CURRENT CONTROL CIRCUIT

FIELD OF THE INVENTION

This invention relates generally to power supplies and more specifically to a mechanism for controlling inrush current in power supplies.

BACKGROUND OF THE INVENTION

Throughout most of the world, electrical power is supplied to consumers as either 110-120 volts or 220-240 volts AC. A power supply in a consumer device rectifies the supplied AC input to produce a DC voltage, which it then uses to operate a connected device. The device may include separate power supplies, one dedicated to the 110-120 volt range and the other dedicated to the 220-240 volt range. Alternatively, to avoid manufacture of separate power supplies for each of the voltage ranges, a power supply may include a rectifying circuit which operates in one mode for a 220-240 volt AC input and in a second, or "doubler" mode, for a 110-120 volt AC input, such that it produces a predetermined DC voltage, for example, a DC voltage of $(\sqrt{2})*220\text{-}240$ volts, in response to either range AC input. The rectifying circuit includes a switch which, as discussed below, configures the circuit for the appropriate mode of operation.

If the AC input is 240 volts, the switch is set to configure the rectifying circuit in a non-doubler mode. In this mode, the rectifiers in the circuit are connected as a full-wave rectifying bridge and two bulk, or filter, capacitors in series across the bridge output terminals. The bridge circuit charges the two capacitors in series during the peak portions of each half-cycle of the AC input and thus produces an output voltage which is equal to $(\sqrt{2})*AC$ input. If the capacitors are of equal capacitance, each one charges to a potential of one-half of the output voltage.

If the input is 120 volts AC, the switch is set to configure the rectifying circuit in the doubler mode. In this mode, only part of the rectifying bridge passes current, such that the bridge charges one capacitor during each of the positive half-cycles of the AC input and the other capacitor during the negative half-cycles. Each capacitor charges to a potential equal to $(\sqrt{2})*AC$ input, and a potential of twice that value is obtained across the two capacitors. The rectifying circuit thus produces, for an AC input of 110-120 volts, a DC output of $(\sqrt{2})*220\text{-}240$ volts.

As stated above, a switch typically controls the configuration of the rectifying circuit. The switch may be operated manually, and thus, set to the correct state by the manufacturer before shipment. Alternatively, the switch may be controlled automatically, such that it switches essentially instantaneously to the doubler mode configuration or the non-doubler mode configuration, as appropriate, as described in U.S. Pat. No. 4,654,538 to Lethellier.

As soon as the rectifier circuit is connected to an AC power source, i.e., plugged into a power outlet, the circuit draws a relatively large current to charge the bulk capacitors. This current, which is referred to as an "inrush" current, can be substantially larger than the current associated with steady state operation of the power supply. Accordingly, the power supply components must be capable of withstanding this large current.

A "soft start" circuit may be added between the power supply and the AC power source, as discussed in U.S. Pat. No. 4,328,459 to McLeod, Jr. The soft start circuit essentially operates a switch to allow increasingly larger portions of the supplied AC input to pass from the AC power source to the power supply while the capacitors are charging. This enables the capacitors to charge gradually, and they thus draw less inrush current. The soft start circuitry, which is dedicated circuitry which must be added to the power supply, increases the cost of the associated consumer device. What is needed is a mechanism to control inrush current which can be incorporated directly into the power supply circuitry, and which utilizes components already included in the power supply.

SUMMARY OF THE INVENTION

A power supply circuit incorporating the invention operates with its rectifying circuit in a non-doubler mode configuration when the power supply is attached to an AC power source, and then switches to the doubler mode, as necessary, when the circuit capacitors are partially charged. When the power supply is connected to a 110-120 volt AC power source, the rectifying circuit operates in the non-doubler mode and charges the capacitors, in series, to a combined potential of $(\sqrt{2})*110\text{-}120$ volts. Since the capacitors are of equal capacitance, each capacitor is charged to a potential of one half the combined potential, or $(\sqrt{2})*55\text{-}60$. When the circuit switches to the doubler mode configuration, the capacitors separately charge from the $(\sqrt{2})*55\text{-}60$ volt potential to a potential of $(\sqrt{2})*110\text{-}120$ volts, for a combined potential of $(\sqrt{2})*220\text{-}240$ volts. The capacitors draw substantially less inrush current in this two-step charging procedure than they do when they must charge in the doubler mode from a zero volt potential to a combined potential of $(\sqrt{2})*220\text{-}240$ volts. To achieve this result, a timer is included in the switch control circuitry.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
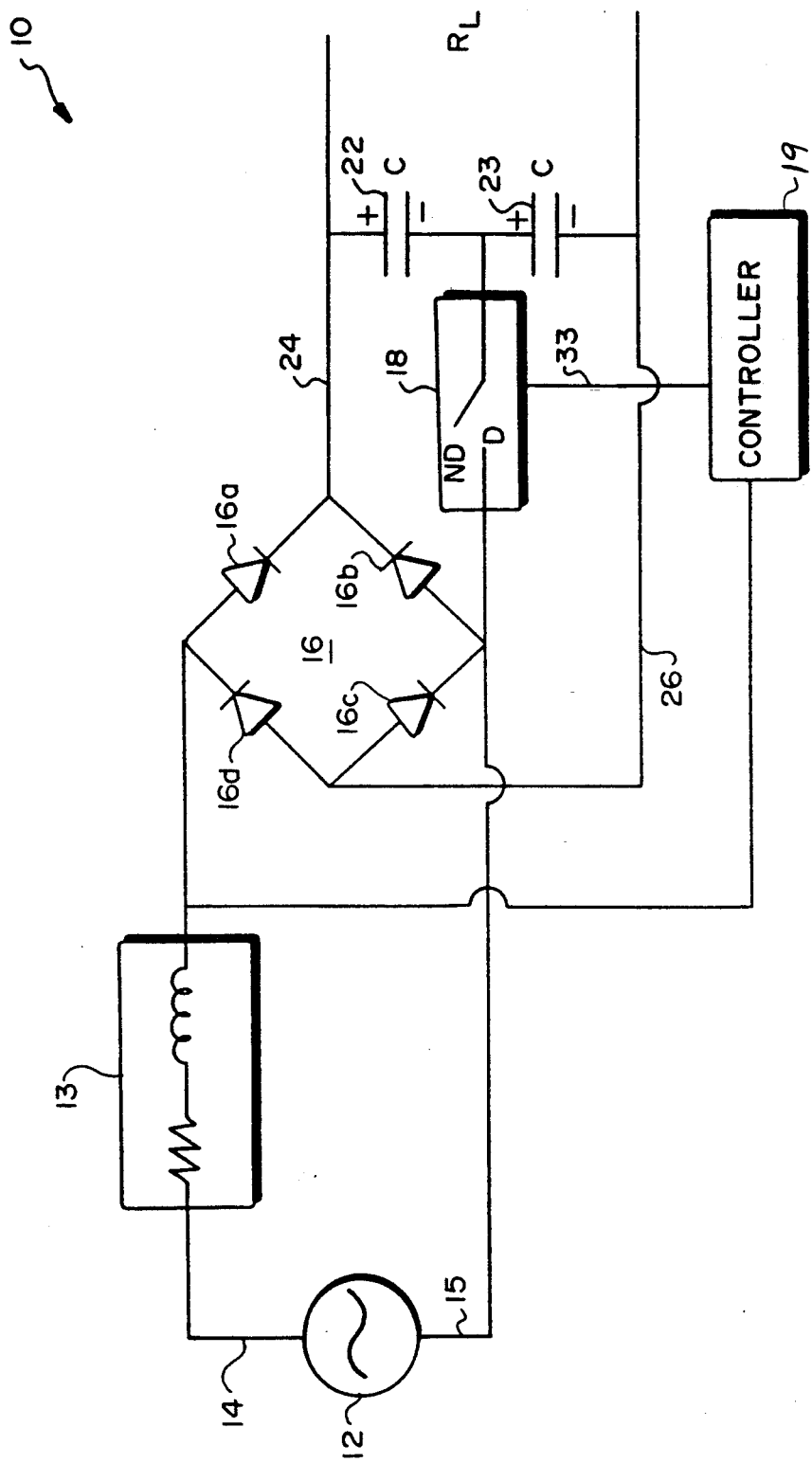
FIG. 1 depicts a rectifier circuit constructed in accordance with the invention.

FIG. 1 depicts a rectifying circuit 10 which may be included in a power supply (not shown). An AC power source 12, providing power at 220-240 volts, is connected to lines 14 and 15 to supply the AC input to a rectifier bridge 16 comprising rectifying diodes 16a-16d. A conventional "snubber" circuit 13 is included in the power supply to smooth out voltage spikes in the AC input. A switch 18, which is controlled by a switch controller 19, is set initially to a non-doubler mode, or non-conducting setting. The rectifying circuit also includes bulk, or filtering capacitors 22-23, which smooth out ripples in the rectified signal produced by the bridge 16.

With the switch 18 at the non-doubler mode setting current passes, during the positive half-cycles of the AC input, from input line 14 through diode 16a and over line 24 to capacitors 22-23 connected in series then over line 26 through diode 16c to input line 15. During the negative portion of each cycle, the current passes through diode 16b, capacitors 22-23 and then over line 26 and through diode 16d to line 14.

The capacitors 22-23 charge in series during both the positive and the negative half-cycles of the AC input. They thus relatively quickly charge to a level which produces across the two of them a voltage drop, or potential, which is related to the AC input. Since the capacitors 22-23 are of equal capacitance in the exemplary system, they each charge to a potential of $(\sqrt{2})*120$ volts.

Without the invention, the rectifying circuit is configured to the doubler mode setting when the power supply is connected to an AC input of 120 volts. In this setting, the rectifying circuit charges the capacitors 22-23 separately during respective half-cycles of the AC input. During the positive half-cycle, current passes from input line 14 through diode 16a and over line 24 to capacitor 22 through switch 18 to input line 15. During the negative half-cycle, current passes from line 15 through switch 18 and diode 16d to input line 14.

The capacitors 22-23 charge separately during consecutive positive and negative half-cycles from a 0 volt potential to a combined potential of 240 volts. The current drawn by the capacitors as they are charging is quite large and the associated energy dissipated as heat may damage nearby components, such as the switch 18 and diodes 16.

To avoid such large currents and the potential damage to the switch 18, the switch controller 19 retains the switch 18 in the non-doubler mode setting for a predetermined time after the connection of the 120 AC power source. While the switch 18 is in this setting, the capacitors are charged to a combined potential of $(\sqrt{2})*120$ volts. Thereafter, the controller 19 sets the switch 18 to the doubler mode, or conductive, setting and the capacitors charge from this potential to a combined potential of $(\sqrt{2})*240$ volts during consecutive positive and negative half-cycles of the AC input.

Since the capacitors 22 and 23 each charge to a potential of approximately $(\sqrt{2})*60$ volts before the controller 19 sets the switch 18 to the doubler mode setting and then charge from the $(\sqrt{2})*60$ volt potential to a $(\sqrt{2})*120$ volt potential, the voltage change across each capacitor is, at any given time, a maximum of $(\sqrt{2})*60$ volts. The capacitors thus do not draw as large an inrush current as capacitors in a circuit which is configured in the doubler mode at the time of connection to the AC signal source. Accordingly, not as much energy is dissipated in the form of heat to nearby components, such as the switch 18 and diodes 16. Also, these components are not subjected to the higher levels of inrush current associated with charging the capacitors from a zero volt potential in the doubler mode, which may cause the components, and in particular the switch 18 to fail.

Figure 2:
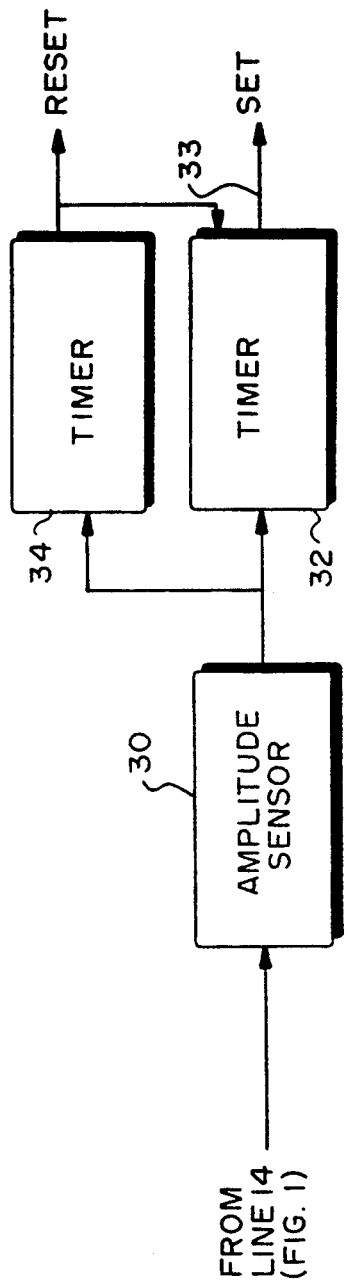
FIG. 2 depicts in more detail a switch controller of FIG. 1.

The controller 19 is depicted in block diagram form in FIG. 2. As discussed above, the switch 18 is initially set to the non-doubler mode setting. A sensor 30 monitors the voltage level on line 14 to determine when the line is connected to the AC power source 12. The sensor 30 then sets a timer 32, the duration of which is based on the time it takes the capacitors 22-23 (FIG. 1) to charge in series to the peak voltage level of the AC input. If the amplitude sensor 30 detects a 240 volt AC signal, the sensor 30 resets the timer to zero before the timer times-out, which prevents the timer from asserting the set signal. The switch 18 then remains in the non-doubler mode setting. Otherwise, the sensor 30 allows the timer to time-out and control the setting of the switch 18 to the doubler mode.

When the timer 32 times-out, it asserts a set signal on line 33 which sets the switch 18 to the doubler mode, or conductive, setting. Thereafter, the switch 18 remains in the doubler mode setting until it is re-set to the non-doubler mode setting by a second timer 34. The timer 34 is activated when the amplitude sensor 30 detects that the voltage level of the AC input signal has fallen below a predetermined minimum level which indicates, for example, that the AC power source has been disconnected. If the peak voltage level of the AC input signal remains below the predetermined minimum level for the full count of the timer, the timer asserts a reset signal, which resets the switch to the non-doubler mode setting.

The advantages achieved by the operation of the controller 19 in a power supply are achieved by including the timers 32 and 34 in a conventional automatic switch control circuit. Thus the cost associated with the inclusion of the controller 19 is relatively small.

Figure 3:
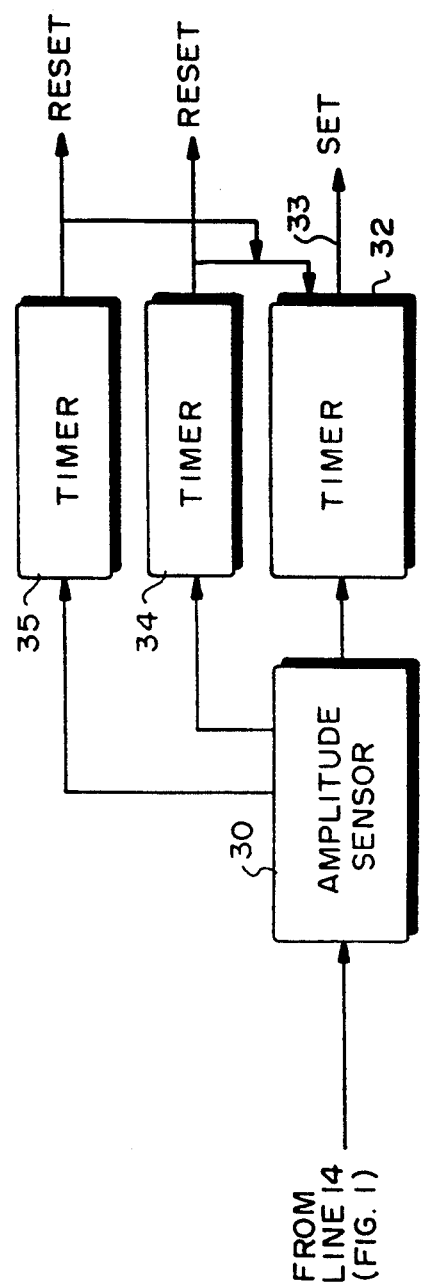
FIG. 3 depicts an alternative embodiment of the switch controller depicted in FIG. 1.

Referring to FIG. 3, an alternative embodiment of the controller 19 includes a third timer 35, which is activated by the amplitude sensor 30 when the sensor determines that the AC input signal has risen above a predetermined maximum voltage level. If the peak AC voltage level remains above the predetermined maximum level for the full count of the timer 35, the timer resets the switch 18 to the non-doubler mode setting by asserting a reset signal on line 36. The timer 35 thus prevents over charging of the capacitors should the AC input signal drift above the 110-120 volt range by more than a predetermined amount. This reset signal also resets the sensor 30, which in turn restarts the timer 32, which controls the setting of the switch to the doubler mode setting. The sensor 30, operating as described above with reference to FIG. 2 allows the timer 32 to set the switch 18 to the non-doubler mode setting, if appropriate.

If the controller 19 is used in a power supply which operates only with a 110-120 volt AC power source, the controller 19 protects the rectifier diodes and other components of the rectifying circuit from the large inrush current associated with charging the capacitors in the doubler mode from a zero volt potential to a combined potential of $(\sqrt{2})*240$ volts. Thus while the power supply must contain all four diodes required for non-doubler mode configuration, it may use smaller, and substantially less expensive diodes than prior supplies. Also, as discussed above, the controller protects the switch from the large inrush current associated with the initial operation of the prior systems. For industrial applications, that is, high power applications, in which dedicated power supplies are commonly used, the reduction of the inrush currents in the 110-120 volt power supply enables a power supply designer to select fuses and circuit breakers which are suited to the current levels associated with the steady state operation of the supply, rather than to the inrush currents.

The foregoing description has been limited to specific embodiments of the invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A power supply for use with an AC power source, the power supply including:
   A. a rectifying bridge with input lines for connecting to the AC power source, the bridge rectifying an input from the AC power source;
   B. bulk capacitors connected to the rectifying bridge;
   C. a switch connected with a first end connected between the capacitors and a second end connected to the rectifying bridge, the switch having a non-conducting state which allows the capacitors to charge in series during each half-cycle of the AC input and a conducting state which allows the capacitors to charge separately during a positive half-cycle and during a negative half-cycle; and
   D. a switch controller for maintaining the switch in the non-conducting state for a predetermined time after connection of the rectifying bridge to the AC power source, the switch controller then setting the switch to the conducting state if the AC input provided by the AC power source is 110–120 volts, the switch controller including
      i. a first timer for counting the time since connection of the AC power source to the rectifying bridge, the first timer timing-out after a predetermined time;
      ii. an amplitude sensor for determining the voltage range of the AC input and resetting the first timer if the amplitude sensor determines that the AC input is within a voltage range of 220–240 volts;
      iii. switch setting means for setting the switch to the conducting state in response to the first timer timing-out;
      iv. a second timer for counting the time since the AC input signal from the AC power source fell below a predetermined minimum level; and
      v. the switch setting means sets the switch to the non-conducting state in response to the second timer timing-out.

2. The power supply of claim 1, wherein the switch controller further includes:
   c. a third timer for counting the time since the AC input signal rose above a predetermined maximum level, and
   d. the switch setting means setting the switch to the non-conducting state in response to the third timer timing out.

3. A power supply for use with an AC power source, the power supply including:
   A. a rectifying bridge with input lines for connecting to the AC power source, the bridge rectifying an input from the AC power source;
   B. bulk capacitors connected to the rectifying bridge;
   C. a switch connected with a first end connected between the capacitors and a second end connected to the rectifying bridge, the switch having a non-conducting state which allows the capacitors to charge in series during each half-cycle of the AC input and a conducting state which allows the capacitors to charge separately during a positive half-cycle and during a negative half-cycle; and
   D. a switch controller for maintaining the switch in the non-conducting state for a predetermined time after connection of the rectifying bridge to the AC power source, the switch controller including
      i. a first timer which is set to time-out a predetermined time after connection of the AC power source, the predetermined time being the time associated with the charging of the capacitors to a predetermined potential;
      ii. an amplitude sensor for determining the peak voltage of the input supplied by the AC power source and resetting the timer if the amplitude sensor determines that the AC input is within a voltage range of 220–240 volts;
      iii. means for setting the switch to the conducting state if the first timer times-out;
      iv. a second timer for counting the time since the AC input signal from the AC power source fell below a predetermined minimum level; and
      v. the switch setting means sets the switch to the non-conducting state in response to the second timer timing out;
      vi. a third timer for counting the time since the AC input signal rose above a predetermined maximum level, and
      v. the switch setting means setting the switch to the non-conducting state in response to the third timer timing out.

* * * * *